United States Patent
Kaur et al.

(10) Patent No.: US 11,042,714 B2
(45) Date of Patent: Jun. 22, 2021

(54) SYNCHRONIZING THE LANGUAGE OF A REMOTE SESSION WITH A CLIENT'S LANGUAGE

(71) Applicant: Dell Products L.P., Round Rock, TX (US)

(72) Inventors: Nisha Kaur, Bangalore (IN); Anil Maryala, Bangalore (IN); Deepthi Chavan, Bangalore (IN); Ajit Kishore, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 217 days.

(21) Appl. No.: 16/438,275

(22) Filed: Jun. 11, 2019

(65) Prior Publication Data
US 2020/0394270 A1    Dec. 17, 2020

(51) Int. Cl.
*G06F 40/58* (2020.01)
*H04L 29/06* (2006.01)
*G06F 9/451* (2018.01)
*G06F 40/263* (2020.01)

(52) U.S. Cl.
CPC ............. *G06F 40/58* (2020.01); *G06F 9/454* (2018.02); *G06F 40/263* (2020.01); *H04L 67/42* (2013.01)

(58) Field of Classification Search
USPC ........... 704/254–276; 710/67, 104–105, 268; 715/702–703, 734, 740–753
See application file for complete search history.

(56) References Cited

U.S. PATENT DOCUMENTS

| | | | |
|---|---|---|---|
| 7,444,278 B2 * | 10/2008 | Bennett | G06F 9/454 704/8 |
| 2003/0233404 A1 * | 12/2003 | Hopkins | G06F 3/0484 709/203 |
| 2007/0078950 A1 * | 4/2007 | Hopkins | H04L 67/2804 709/217 |
| 2013/0179145 A1 * | 7/2013 | Patel | G06F 40/58 704/3 |
| 2013/0342467 A1 * | 12/2013 | Cresp | H04L 67/14 345/172 |
| 2019/0132381 A1 * | 5/2019 | Momchilov | G06F 9/54 |

* cited by examiner

*Primary Examiner* — Marcellus J Augustin
(74) *Attorney, Agent, or Firm* — Kirton McConkie; Brian Tucker

(57) ABSTRACT

The language of a remote session can be synchronized with a client's language. A client-side synchronizer can be configured to detect when a client establishes a remote session on a server, whether to access a remote desktop or a remote application. When the client-side synchronizer detects the establishment of a remote session, it can access client-side language settings to gather language information and send it to a server-side synchronizer. The server-side synchronizer can then employ the language information to modify server-side language settings applicable the remote session so that the remote desktop or remote application will employ language settings that match the client-side language settings. In this way, the remote desktop or remote application will be in the language that the user expects even if the server's predefined language settings do not match user's language.

20 Claims, 9 Drawing Sheets

SYNCHRONIZING THE LANGUAGE OF A REMOTE SESSION WITH A CLIENT'S LANGUAGE

CROSS-REFERENCE TO RELATED APPLICATIONS

N/A

BACKGROUND

FIG. 1 and the following description provide a general overview of a virtual desktop infrastructure (VDI) environment 100. The term "VDI environment" should be construed as encompassing any client-server environment in which a remote display protocol (e.g, Microsoft's Remote Desktop Protocol (RDP), Citrix's HDX, VMWare's PCoIP, the Remote Frame Buffer (RFB) protocol, etc.) is employed to enable the client to access a desktop or application that executes on the server. VDI environment 100 is depicted as including a number of client terminals 102*a*-102*n* (referenced generally herein as client(s) 102) in communication with a server 104 via a network 106. Server 104 can be configured to support a remote session (e.g., a remote desktop session or remote application session) in which a user at a client 102 can remotely access applications and data at the server 104 from the client 102.

Client terminal 102 may represent any computing device that is capable of implementing a remote display protocol for the purpose of accessing a remote session on server 104. As examples, client terminal 102 could be a computing device that runs a version of Windows, Linux, iOS, Android, or another operating system and that includes a VDI client such as the Windows Remote Desktop Connection application, the VMWare Horizon client, the Citrix Workspace app, a VNC client, etc. Server 104 may represent any number of computing devices or computing components (e.g., a cloud architecture) that can function as a server for the purpose of hosting remote sessions that users of client 102 may access via a remote display protocol. As examples only, server 104 could be a physical or virtual machine that executes a version of the Windows Server operating system that includes Remote Desktop Services or a physical or virtual machine that executes a version of the Linux operating system that includes a VNC server.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106 using a remote display protocol, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106 using a remote display protocol. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104.

In the remaining description and the claims, the term "remote session" will be used to represent both full remote desktops and remote applications. As is known, a user may use VDI techniques to access a full desktop that is hosted on server 104 or a single application (e.g., a Windows RemoteApp) that is executed on server 104. When a full desktop is accessed, server 104 would send display data for the full desktop. In contrast, when a single application is accessed, server 104 would send the display data pertaining to the remote application's interface.

When a user establishes a remote session, the server's language settings (i.e., the language settings of the operating system that provides the remote session) will be applied to the desktop or application that is presented to the user. For example, if server 104 is configured to launch desktops that are in English, the content of the desktop will be in English even if the user has configured client 102 to employ a different language. Similarly, most applications are configured to employ the same language as the operating system, and therefore, a remote application that is executed in an English remote session will be in English even if client 102 employs a different language.

The use of the server's language is generally not problematic if all users are located in the same region (e.g., when all users speak the same language). In contrast, if users of server 104 are located around the world and speak different languages, the use of the server's language for remote sessions is problematic. For example, if a Japanese speaking user of client 102 accesses a remote session on server 104, and server 104 is configured to provide English desktops or remote applications, the Japanese speaking user may be unable to read the content of the desktop or remote application.

One way to address this problem is to configure a different server for each possible language the users may speak. For example, an organization may provision one server to provide English remote sessions, one server to provide Spanish remote sessions, one server to provide French remote sessions, etc. This approach, however, complicates the establishment and maintenance of a VDI environment. Furthermore, it can be difficult to know which server a particular user should access.

Another possible way to address this problem is to enable the user to set the language of the remote session after logging in. Yet, this approach is equally undesirable because it requires provisioning the server with all possible languages and also requires that the users know how to change the language. Since many users do not know how to do this, particularly when they would be attempting to do so using an interface that may be in a language that they do not understand, the administrator would routinely be required to assist. Also, this may only be an option when the user is accessing a remote desktop since remote applications typically do not provide the ability to change the language.

Even if the user is able to change the language for display purposes, the keyboard likely would not match the new language. In particular, the settings that define the language in which the desktop or application content is displayed are different from those that define the keyboard layout (i.e., the mappings between keys and characters). Therefore, if the user were able to change the language settings to cause a desktop to be in Spanish rather than English, the keyboard on the server would likely still be set to an English layout. If the user has configured client 102 with a Spanish keyboard layout, he or she would be frustrated when keyboard input is interpreted on the server based on the English layout.

In short, the globalization of many organizations has made it much more difficult to provide VDI environments that match the language of the end user. When an organization's employees are in different regions where different languages are spoken, an administrator may have no option other than to provision servers for each different region and language to ensure that each user can access a remote session that will be in his or her language.

BRIEF SUMMARY

The present invention extends to methods, systems, and computer program products for synchronizing the language of a remote session with a client's language. A client-side synchronizer can be configured to detect when a client establishes a remote session on a server, whether to access a remote desktop or a remote application. When the client-side synchronizer detects the establishment of a remote session, it can access client-side language settings to gather language information and send it to a server-side synchronizer. The server-side synchronizer can then employ the language information to modify server-side language settings applicable the remote session so that the remote desktop or remote application will employ language settings that match the client-side language settings. In this way, the remote desktop or remote application will be in the language that the user expects even if the server's predefined language settings do not match user's language.

In one embodiment, the present invention is implemented as a method for synchronizing a language of a remote session with a client's language. A client-side synchronizer that executes on a client can detect that the client has established a remote session on a server. In response to detecting that the client has established the remote session on the server, the client-side synchronizer can access client-side language settings to retrieve language information and then send the language information to a server-side synchronizer. The server-side synchronizer can generate one or more requests to modify server-side language settings to match the language information that was retrieved from the client-side language settings.

In another embodiment, the present invention is implemented as computer storage media storing computer executable instructions which when executed in a VDI environment implement a method for synchronizing a language of a remote session with a client's language. In response to a VDI client that executes on a client initiating a remote session on a server, a client-side synchronizer can access client-side language settings to retrieve language information. The language information defines a current locale of the client. The client-side synchronizer sends the language information to a server-side synchronizer that executes on the server. In response to receiving the language information, the server-side synchronizer accesses server-side language settings to determine a current locale of the remote session. The server-side synchronizer compares the current locale of the remote session to the current locale of the client that is defined in the language information. Upon determining that the current locale of the remote session does not match the current locale of the client, the server-side synchronizer modifies the server-side language settings to cause the current locale of the remote session to match the current locale of the client.

In another embodiment, the present invention is implemented as computer storage media storing computer executable instructions which when executed implement a client-side synchronizer and a server-side synchronizer. The client-side synchronizer executes on a client and is configured to detect when a remote session is initiated on a server. In response to detecting that a remote session has been initiated, the client-side synchronizer accesses client-side language settings to retrieve and send language information to the server-side synchronizer. The server-side synchronizer is configured to receive the language information from the client-side synchronizer and, in response, modify server-side language settings to match the language information.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "language settings" should be construed as encompassing settings that define a language in which desktop and/or application content is displayed ("display language") and/or settings that define a layout of a keyboard ("keyboard layout"). These language settings would typically be maintained by the operating system. "Client-side language settings" encompass settings that define the display language and/or keyboard layout(s) on the client. "Server-side language settings" encompass settings that define the display language and/or keyboard layout(s) on the server. The term "language information" should be construed as information that is derived from language settings and that is exchanged between a client and a server for the purpose of synchronizing the language of a remote session with a client's language. The term "locale" should be given its customary computer software meaning, namely a set of one or more parameters that define a user's language and/or region.

Figure 1:
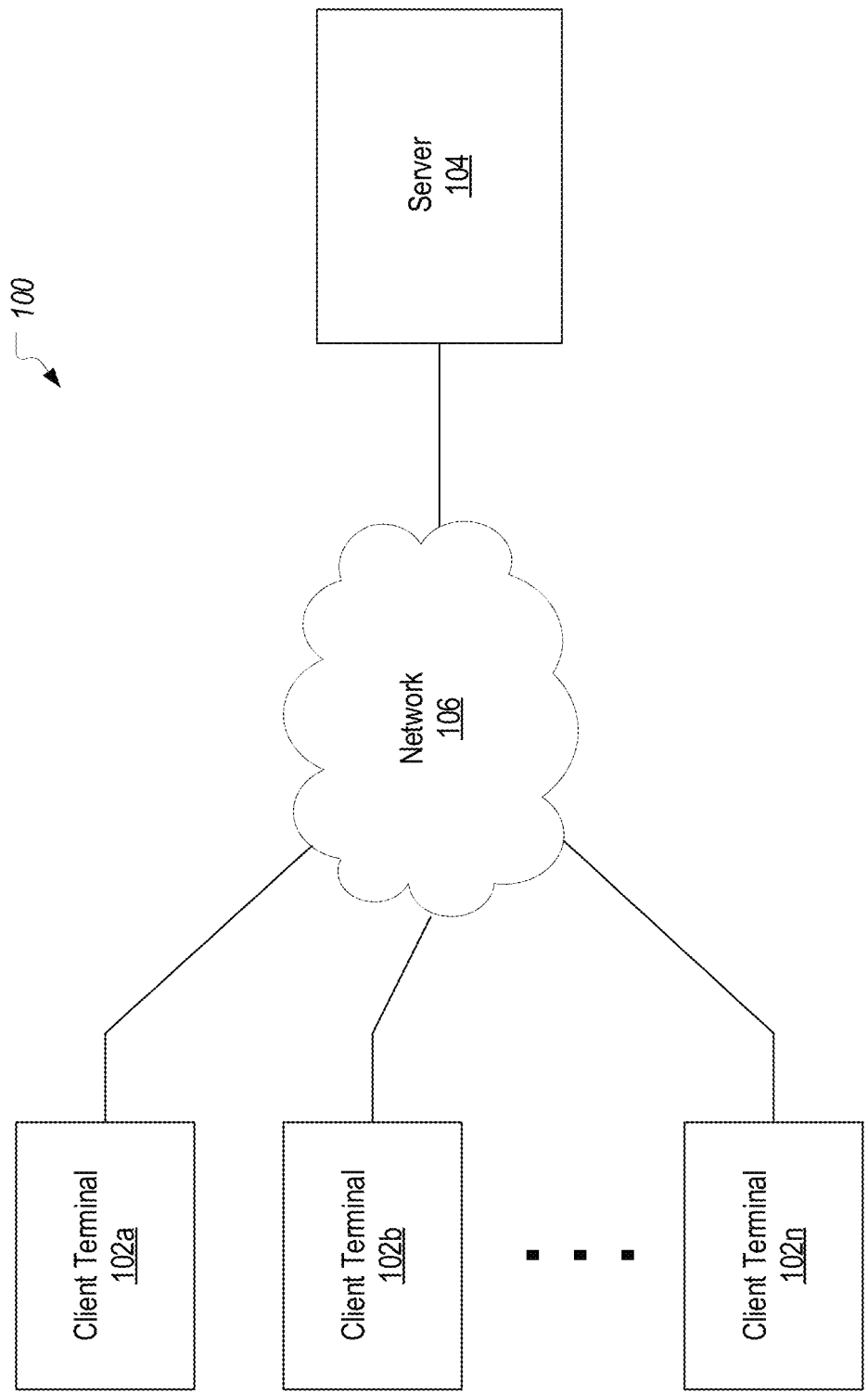
FIG. 1 illustrates an example VDI environment in which the present invention can be implemented.
Figure 2:
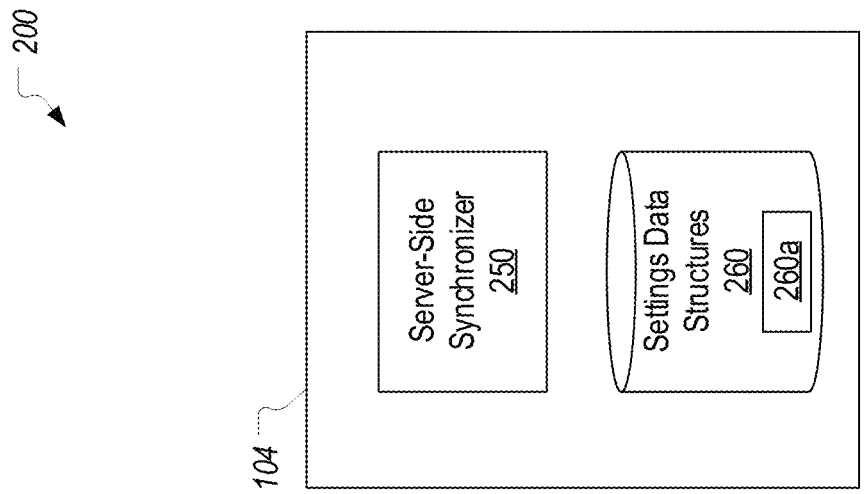
FIG. 2 illustrates components of a client and a server that can be employed to implement the techniques of the present invention.
Figure 2:
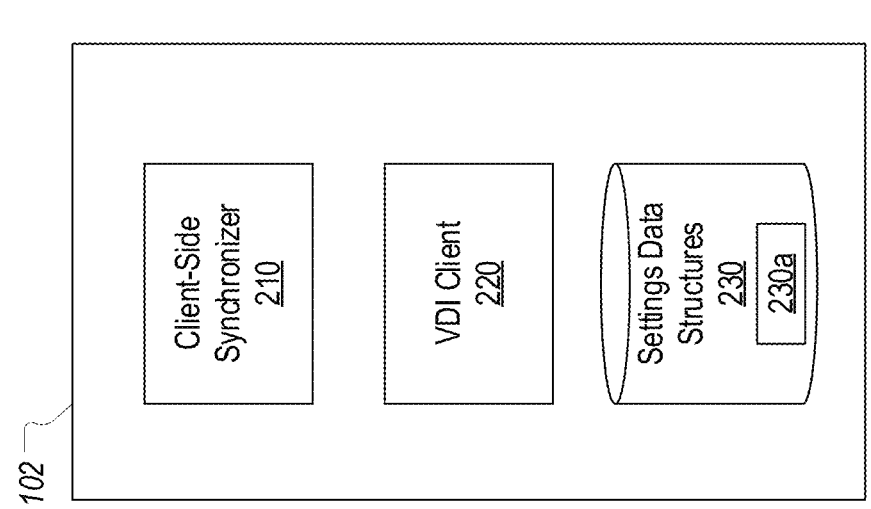

FIG. 2 illustrates a VDI environment 200 in which client 102 and server 104 include components for implementing the techniques of the present invention. As shown, client 102 can include a client-side synchronizer 210 while server 104 can include a server-side synchronizer 250. Client 102 is also shown as including a VDI client 220 which can represent any of the many different VDI clients including those identified in the background. For purposes of this description, VDI client 220 provides the functionality for establishing a remote session on server 104. Although not shown, server 104 would include the various components necessary to provide remote sessions to clients 102 (e.g., server 104 could be provisioned with Remote Desktop Services or a VNC server).

Client 102 and server 104 are also shown as including settings data structures 230 and 260 respectively. Settings data structures 230 and 260 are intended to generally represent the data structures/locations where settings, including client-side language settings 230a and server-side language settings 260a, are maintained on client 102 and server 104. As an example, settings data structures 230 and 260 could represent the registry in a Windows environment or environment variables in a Linux environment. It is noted that the operating system on client 102 need not match the operating system on server 104. For example, client 102 could run a version of Linux while server 104 could run a version of Windows, and vice versa.

Figure 2A:
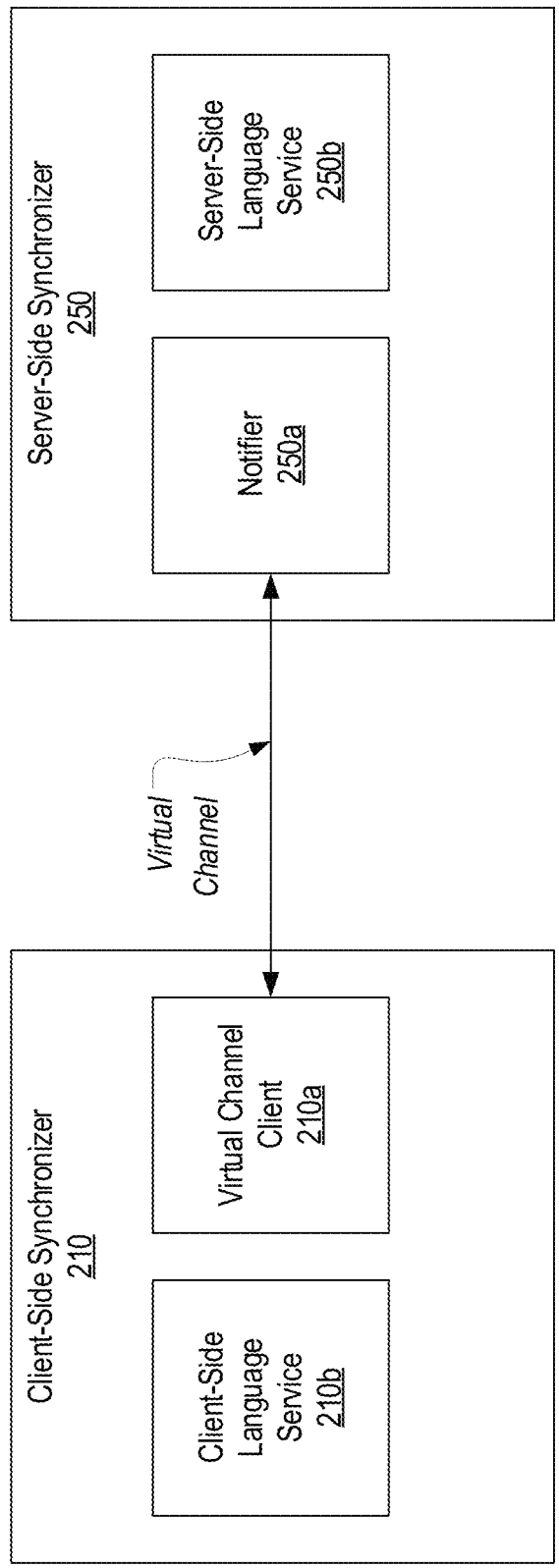
FIG. 2A illustrates an example configuration of client-side and server-side synchronizers.

FIG. 2A illustrates an example of how client-side synchronizer 210 and server-side synchronizer 250 can be configured in some embodiments of the present invention. It is noted, however, that the functionality that client-side synchronizer 210 and server-side synchronizer 250 should not be constrained to any particular set or arrangement of components.

Client-side synchronizer 210 can include a virtual channel client 210a that functions as a virtual channel endpoint on client 102 when VDI client 220 has established a remote session on server 104. Virtual channel client 210a can also be configured to interface with VDI client 220 for the purpose of detecting when VDI client 220 is establishing or has established a remote session. For example, virtual channel client 210a could register with VDI client 220 or the operating system to be notified whenever VDI client 220 establishes a remote session. Alternatively, virtual channel client 210a could listen for the creation of remote sessions (e.g., by watching for TCP connections that target a particular server-side port). In short, virtual channel client 210a can use any available technique for detecting when VDI client 220 establishes a remote session. Client-side synchronizer 210 can also include a client-side language service 210b that is configured to access client-side language settings 230a that are stored in settings data structure 230.

Server-side synchronizer 250 includes a notifier 250a that can function as a corresponding virtual channel endpoint on server 104. In other words, virtual channel client 210a can be configured to communicate with notifier 250a via a virtual channel when VDI client 220 has established a remote display protocol connection with server 104. These communications can include the sharing of language information as will be described in detail below. Server-side synchronizer 250 also includes a server-side language service 250b that is configured to receive language information from notifier 250a and, in response, modify server-side language settings 260a in settings data structures 260.

Figure 3A:
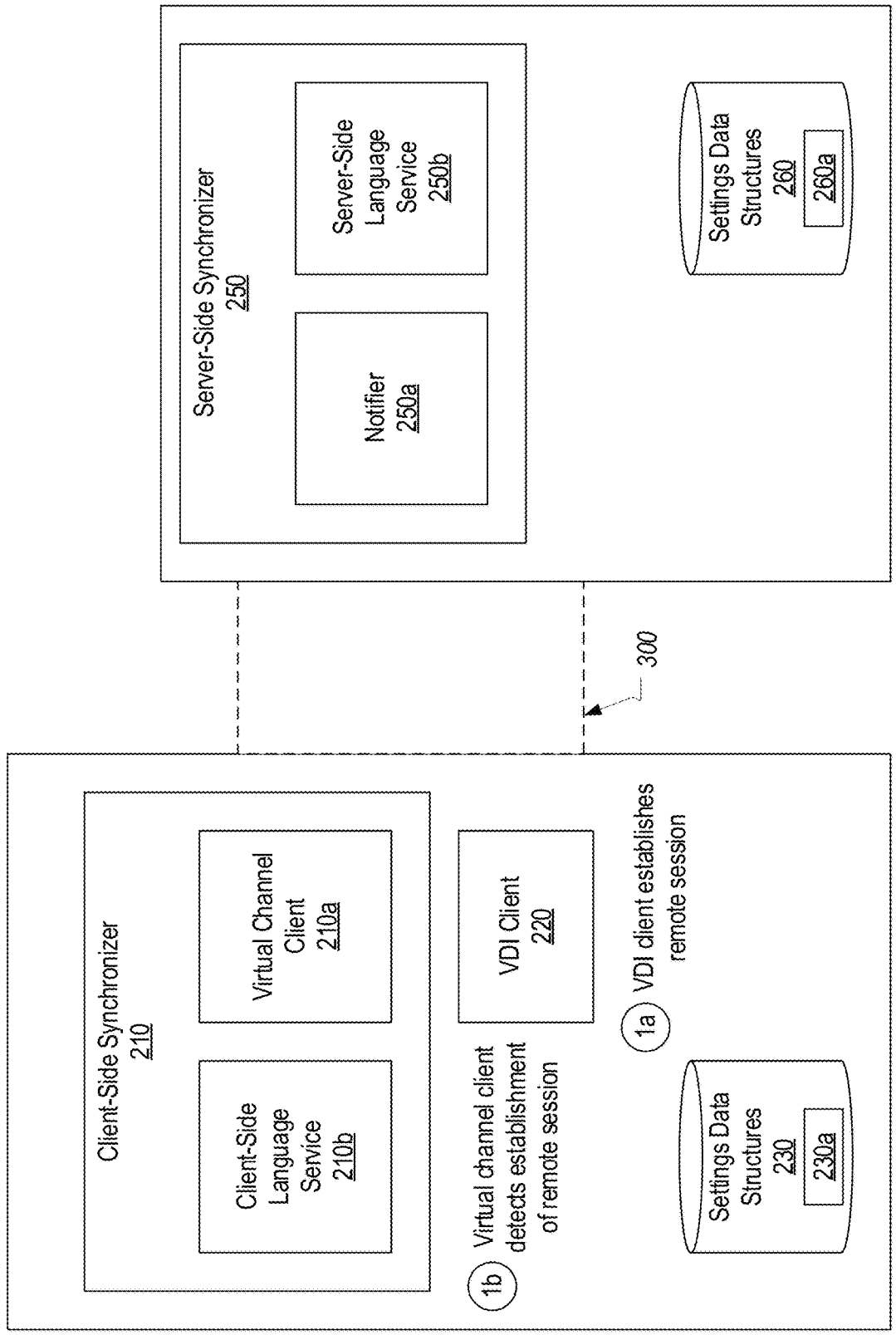
FIGS. 3A-3D illustrate how the present invention can synchronize the language of a remote session with a client's language.

FIGS. 3A-3D illustrate how client-side synchronizer 210 and server-side synchronizer 250 can cause the language of a remote session on server 104 to be synchronized with the language of client 102. In FIG. 3A, it is assumed that VDI client 220 has established a remote session in step 1a. As is known, VDI client 220 can establish a remote display protocol connection 300 by which the remote session is accessed. Although not shown, VDI client 220 could interface with one or more other servers (e.g., an authentication server, a connection broker, etc.) as part of establishing the remote session. It is also again reiterated that the remote session could be in the form of a remote desktop or a remote application.

In step 1b, virtual channel client 210a can detect the establishment of the remote session. As indicated above, virtual channel client 210a can accomplish this in a number of different ways and may do so in response to or as part of the establishment of the remote session. In many embodiments, client-side synchronizer 210 will be an independent component from VDI client 220 (i.e., client-side synchronizer 210 and VDI client 220 will be provided by different entities), and therefore, virtual channel client 210a can employ whatever technique is available for detecting when a particular VDI client 220 has established a remote session. As an example only, virtual channel client 210a could be a DLL that has registered as a virtual channel client with the Windows operating system (e.g., by adding a subkey to the appropriate Terminal Server Client registry entries) so that it will be loaded during the Remote Desktop Services initialization process.

Figure 3B:
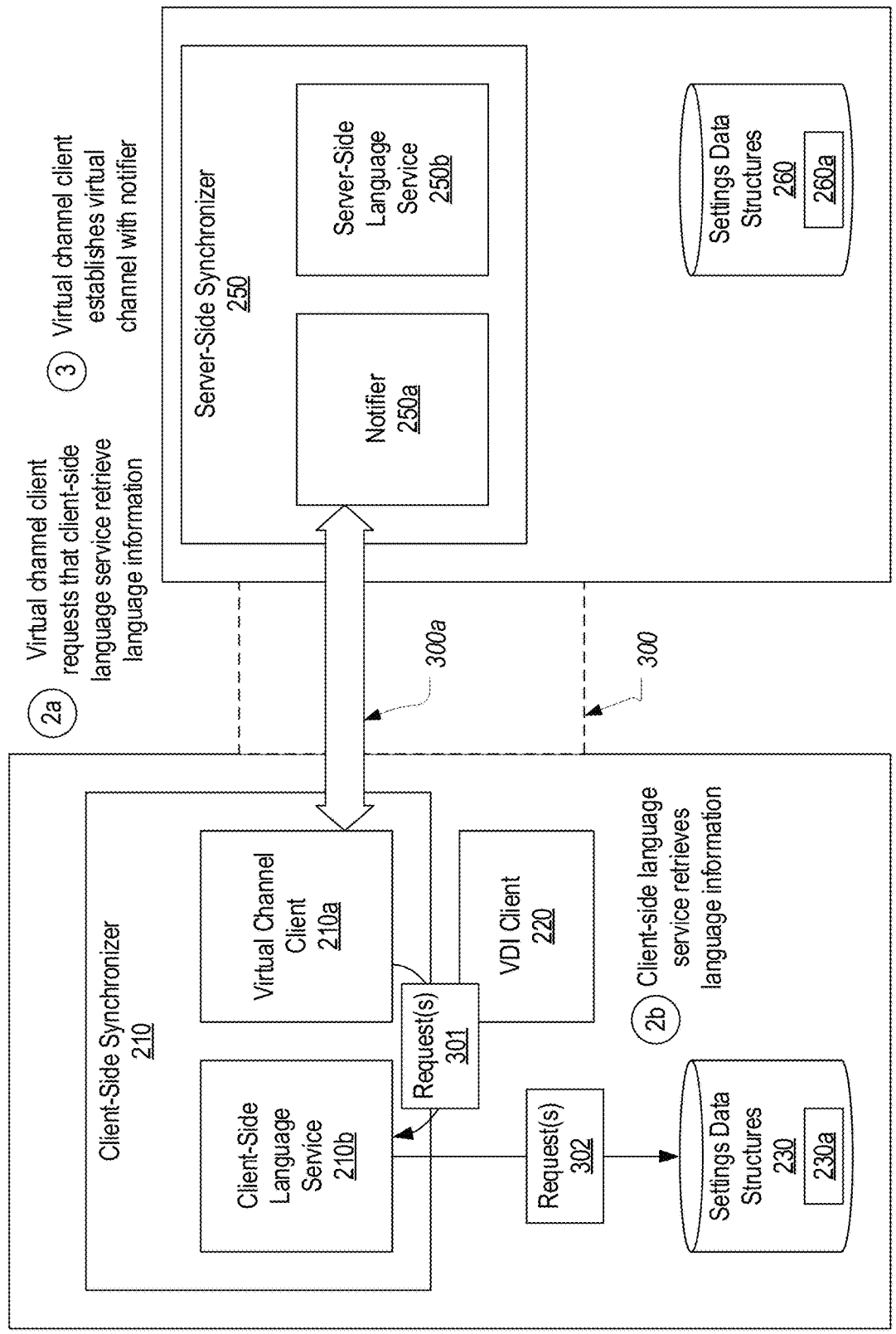

Turning to FIG. 3B, in step 2a, which can be performed in response to detecting the establishment of the remote session, virtual channel client 210a can send one or more requests 301 to client-side language service 210b. Requests 301 can instruct client-side language service 210b to retrieve client 102's language information. Client-side language service 210b can respond, in step 2b, by generating one or more requests 302 to obtain client 102's language information from client-side language settings 230a in settings data structures 230.

The form of requests 302 can vary based on client 102's operating system as well as the specific types of language information that are being requested. For example, if client 102 is running a version of Windows, client-side language service 210b could invoke the GetLocaleInfoEx function to retrieve the current user's "locale" (e.g., by specifying the LOCALE_NAME_USER_DEFAULT constant for the lpLocaleName input parameter and the LOCALE_USER_DEFAULT constant for the LCType input parameter). The GetLocaleInfoEx function may return a locale ID (LCID) that defines the current locale (e.g., EN-US for a US English locale or ES-AR for an Argentina Spanish locale). In contrast, if client 102 is running a version of Linux, client-side language service 210b could read the value of the LANG environment variable (e.g., using a suitable function such as localectl) which typically defines client 102's locale using a similar LCID.

If requests 302 are also intended to retrieve client 102's keyboard layout(s), client-side language service 210b could employ the Windows-based SystemParametersInfoA function to retrieve the language identifier for the keyboard layout (e.g., 00000409 for a US English layout) or the Linux-based localectl (or similar function) to read the available keyboard layouts (e.g., by specifying the list-x11-keymap-layouts option).

In conjunction with sending requests 301, virtual channel client 210a and notifier 250a can also establish a virtual channel 300a within remote display protocol connection 300. For example, virtual channel client 210a could initialize virtual channel 300a by registering a name of the virtual channel, opening the virtual channel and providing appropriate callback functions that VDI client 220 can call when events relevant to the virtual channel occur. Notifier 250a could perform similar tasks on server 104. With virtual channel 300a established, virtual channel client 210a and notifier 250a will be able to communicate language information via remote display protocol connection 300.

Figure 3C:
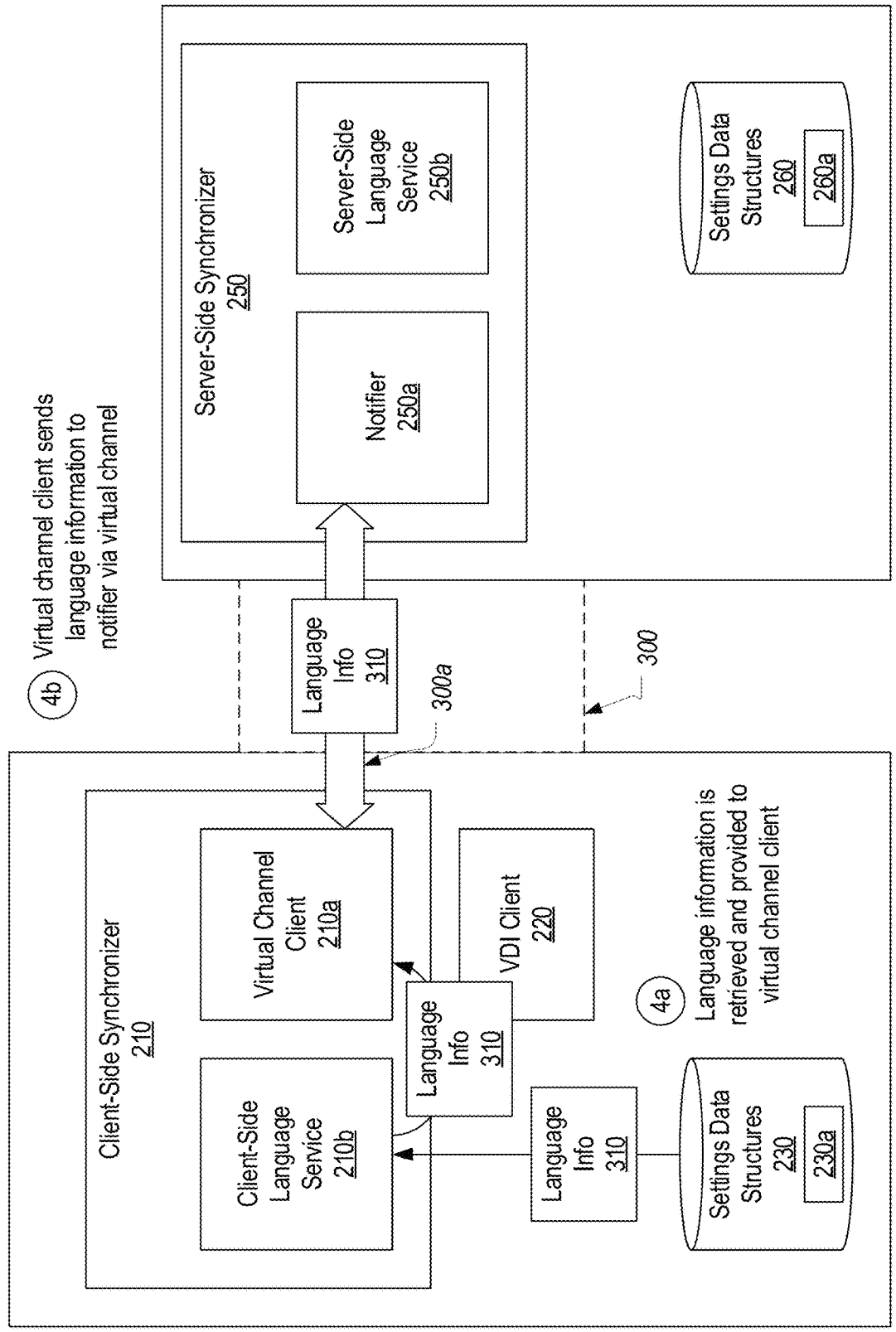

In step 4a shown in FIG. 3C, language information 310 is shown as being provided to virtual channel client 210a in response to requests 301/302. As indicated above, language information 310 can be extracted from client-side language settings 230a and can include client 102's current locale (e.g., in the form of a LCID), one or more keyboard layouts (e.g., in the form of a language identifier) and possibly other types of location information such as hot key definitions for toggling between different keyboard layouts. In step 4b, virtual channel client 210a can send language information 310 to notifier 250a via virtual channel 300a (e.g., by calling the VirtualChannelWrite function or similar function).

Figure 3D:
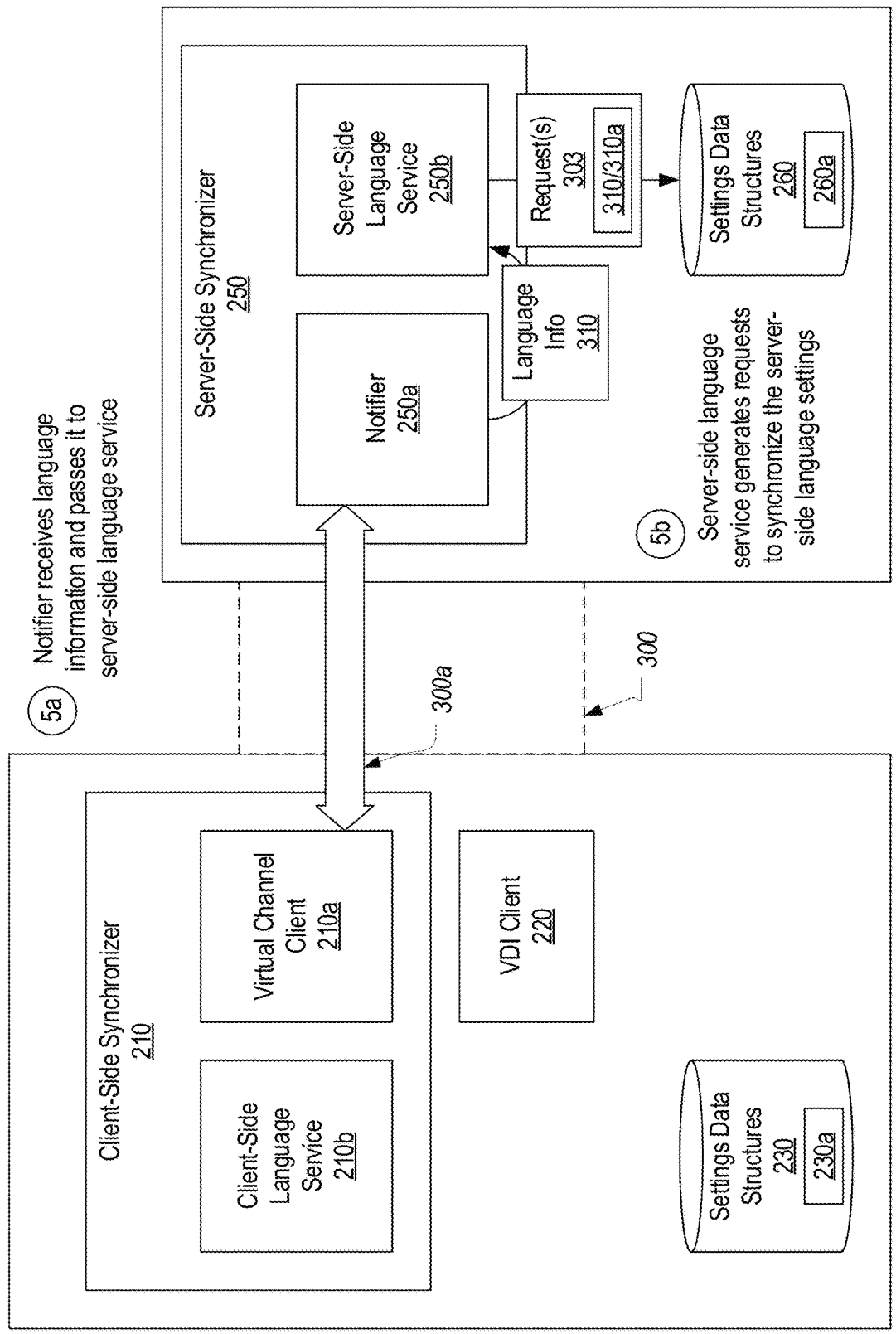

FIG. 3D shows that notifier 250a receives language information 310 via virtual channel 300a (e.g., by calling the WTSVirtualChannelRead function) and passes it to server-side language service 250b in step 5a. In step 5b, server-side language service 250b generates one or more requests 303 for modifying server-side language settings 260a based on the received language information 310. Requests 303 are shown as including language information 310 and/or modified language information 310a to represent that server-side language service 250b may modify language information 310 as part of step 5b. For example, if client 102 and server 104 are not running the same operating system, language information 310 may not be directly compatible with server-side language settings 260a. In such cases, server-side language service 250b can convert language information 310 as necessary and employ modified language information 310a in requests 303.

As with requests 302, the form of requests 303 can vary based on server 104's operating system as well as the specific server-side language settings 260a that are being modified. For example, if server 104 is running Windows, server-side language service 250b could call the SetLocaleInfoA function to set server 104's locale to match a locale defined in location information 310. If server 104 is running Linux, server-side language service 250b could modify the value of the LANG environment variable to match a locale defined in location information 310. For a keyboard layout, server-side language service 250b could employ the SystemParameterslnfoA (or similar) function in Windows or the setxkbmap (or similar) function in Linux to set a keyboard layout on server 104 matching any keyboard layout defined in language information 310.

Although not represented in the figures, server-side language service 250b could generate requests similar to request 302 to determine what the server-side language settings 260a are prior to generating requests 303. For example, server-side language service 250b could retrieve the current (or default) locale and keyboard layout(s) on server 104 and compare them to language information 310. If there is not a mismatch, server-side language service 250b can forego generating requests 303 or may only generate requests that are necessary to synchronize any mismatched language setting (e.g., by changing a mismatched locale but not changing any keyboard layout). Accordingly, step 5b should be construed as encompassing the retrieval of server-side language settings 260a for the purpose of comparing them to language information 310 to determine which if any of the server-side language settings 260a should be modified.

Also, although not shown, in step 5b, server-side synchronizer 250 could prompt the user to confirm whether the server-side language settings should be synchronized with the client-side language settings. For example, notifier 250a could generate a dialog that is presented to the user via the remote session. Alternatively, virtual channel client 210a (or another component of client-side synchronizer 210) could prompt the user locally to confirm whether this synchronization should be performed. In some embodiments, this prompt could be presented to the user after server-side language service 250b determines that a mismatch exists between server-side language settings 260a and language information 310.

Figure 4:
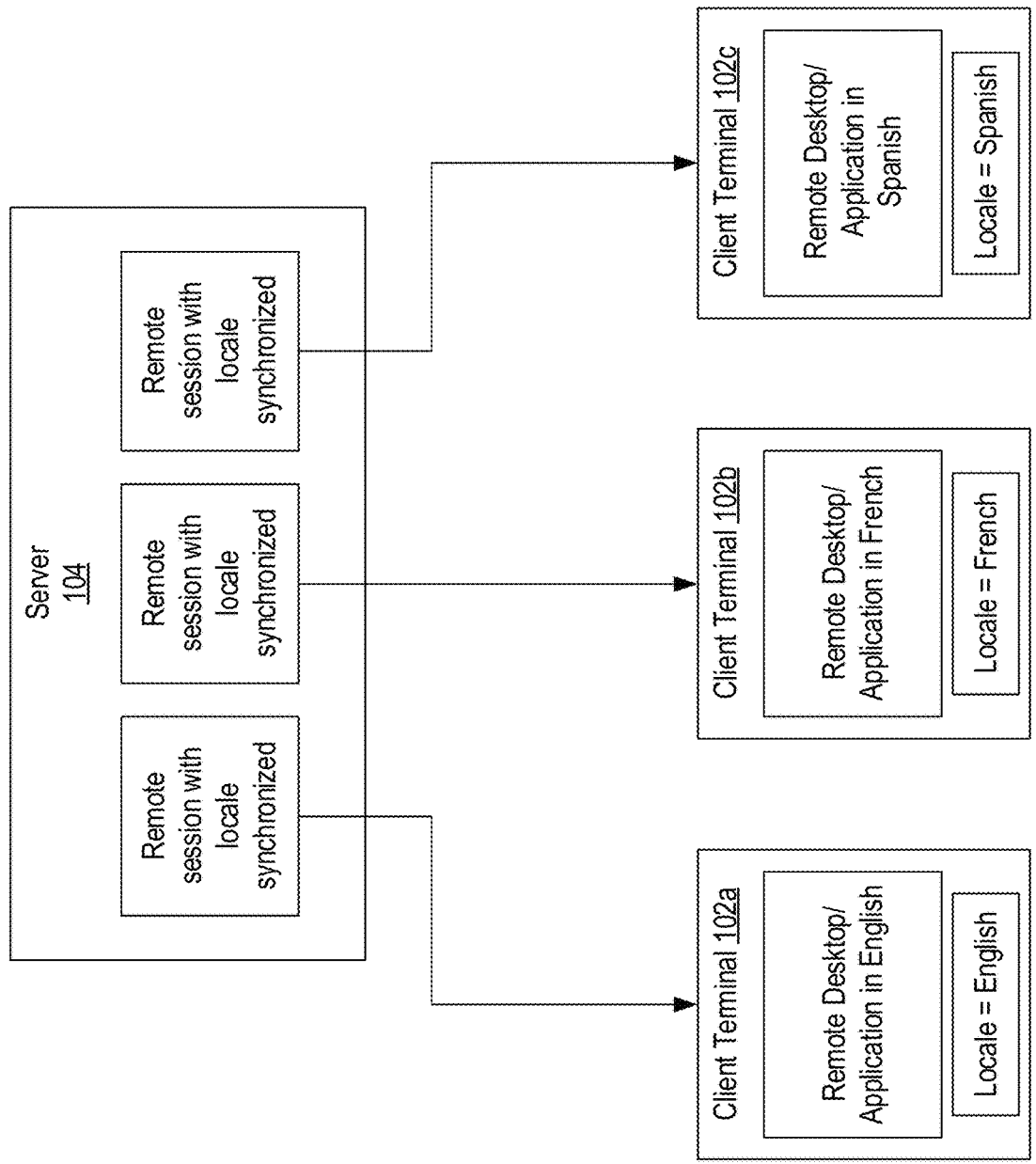
FIG. 4 illustrates how each remote session on a server 104 can have its locale synchronized to the corresponding client's locale.
Figure 5:
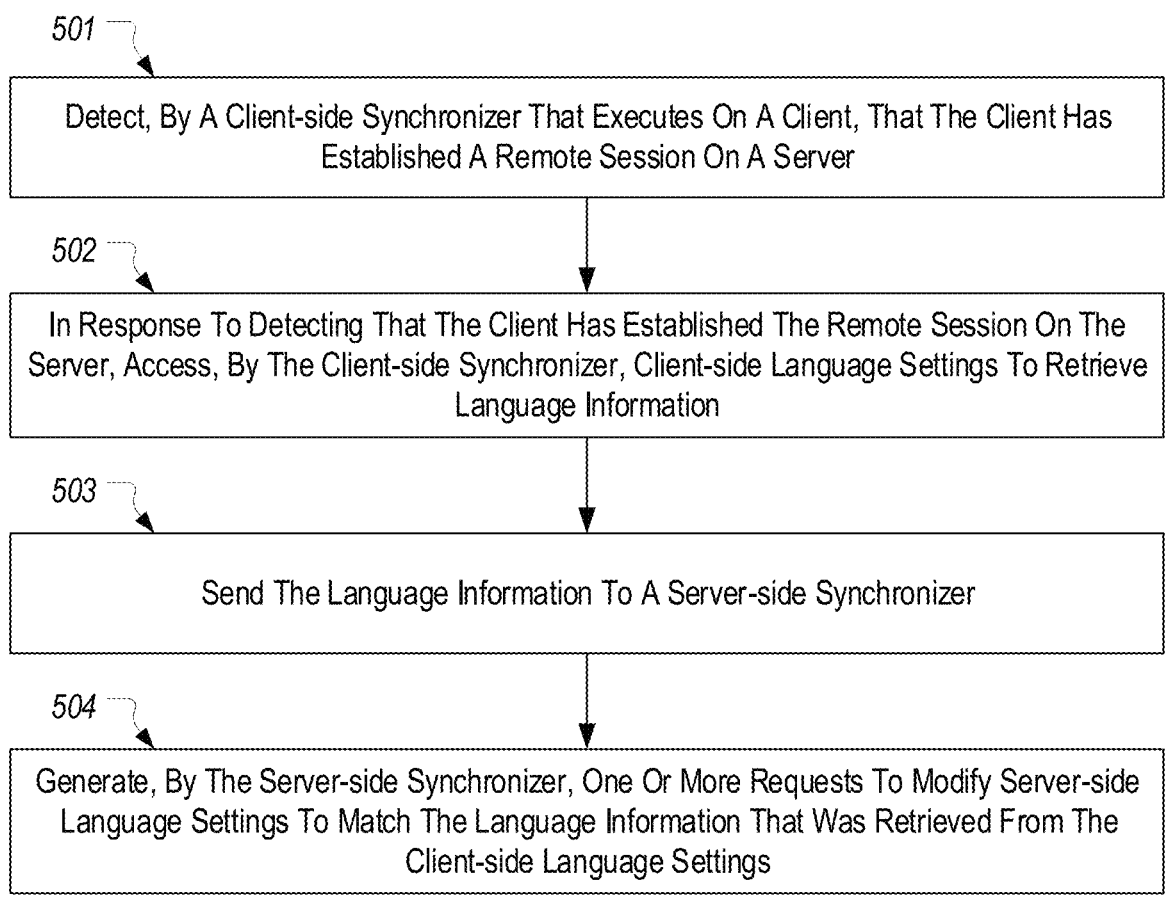
FIG. 5 provides a flowchart of an example method for synchronizing the language of a remote session with a client's language.

FIG. 4 represents one primary benefit of the techniques of the present invention. It is assumed that the client-side language settings 230a on client terminals 102a-102c define an English locale, a French locale and a Spanish locale respectively (e.g., the users are located in the US, France and Spain respectively). Server 104, which can represent a single VDI server, is shown as hosting a remote session for each of client terminals 102a-102c. As described above, the server-side language settings 260a applicable to each of these remote sessions can be automatically synchronized with the client-side language settings 230a of the corresponding client so that a remote desktop or application is presented to the user in the user's language. Each user's keyboard input to the remote desktop or application can also be as expected due to the synchronization of any keyboard layouts. Importantly, this synchronization occurs even though the administrator likely would have defined a specific locale and keyboard layout to be used for any remote desktop or application server 104 hosts. In other words, the present invention eliminates the need to provision a different VDI server or publish a different desktop for each possible locale FIG. 5 provides a flowchart of an example method 500 for synchronizing the language of a remote session with a client's language. Method 500 can be implemented in VDI environment 200 by client-side synchronizer 210 and server-side synchronizer 250.

Method 500 includes an act 501 of detecting, by a client-side synchronizer that executes on a client, that the client has established a remote session on a server. For example, virtual channel client 210a could be notified when VDI client 220 establishes remote display protocol connection 300.

Method 500 includes an act 502 of, in response to detecting that the client has established the remote session on the server, accessing, by the client-side synchronizer, client-side language settings to retrieve language information. For example, virtual channel client 210a could send requests 301 to client-side language service 210b to cause client-side language service 210b to generate requests 302 for retrieving location information from client-side language settings 230a.

Method 500 includes an act 503 of sending the language information to a server-side synchronizer. For example, virtual channel client 210a can send language information 310 to notifier 250a via virtual channel 300a.

Method 500 includes an act 504 of generating, by the server-side synchronizer, one or more requests to modify server-side language settings to match the language information that was retrieved from the client-side language settings. For example, server-side language service 250b can generate requests 303 to cause server-side language settings 260a to be modified to match language information 310.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for synchronizing a language of a remote session with a client's language, the method comprising:
   detecting, by a client-side synchronizer that executes on a client, that the client has established a remote session on a server;
   in response to detecting that the client has established the remote session on the server, accessing, by the client-side synchronizer, client-side language settings to retrieve language information, wherein the language information comprises a locale of the client;
   sending the language information to a server-side synchronizer; and
   generating, by the server-side synchronizer, one or more requests to modify server-side language settings to match the language information that was retrieved from the client-side language settings, wherein modifying the server-side language settings includes modifying a locale applicable to the remote session on the server to match the locale of the client.

2. The method of claim 1, detecting that the client has established the remote session on the server comprises receiving a notification that a virtual desktop infrastructure (VDI) client that executes on the client has initiated a remote display protocol connection.

3. The method of claim 1, wherein accessing the client-side language settings comprises one or more of:
   calling an operating-system providing function to receive the language settings; or
   reading one or more environment variables.

4. The method of claim 1, wherein the language information further comprises one or more keyboard layouts that are set on the client.

5. The method of claim 1, wherein sending the language information to the server-side synchronizer comprises sending the language information over a virtual channel.

6. The method of claim 1, further comprising:
   prior to generating the one or more requests, accessing, by the server-side synchronizer, server-side language settings to determine whether the server-side language settings match the language information;
   wherein the server-side synchronizer generates the one or more requests only when the server-side language settings do not match the language information.

7. The method of claim 6, wherein the language information includes a keyboard layout of the client, and wherein accessing the server-side language settings comprises identifying a keyboard layout applicable to the remote session on the server.

8. The method of claim 6, further comprising:
   prompting a user of the client to confirm whether the server-side language settings should be modified to match the language information that was retrieved from the client-side language settings.

9. The method of claim 1, wherein an operating system of the client is different from an operating system that hosts the remote session on the server.

10. The method of claim 1, wherein the remote session comprises a remote desktop or a remote application.

11. A method for synchronizing a language of a remote session with a client's language, the method comprising:
    detecting, by a first client-side synchronizer that executes on a first client, that the first client has established a first remote session on a server;
    in response to detecting that the first client has established the first remote session on the server, accessing, by the first client-side synchronizer, client-side language settings on the first client to retrieve language information for the first client;
    sending the language information for the first client to a first server-side synchronizer on the server;
    generating, by the first server-side synchronizer, one or more requests to modify server-side language settings pertaining to the first remote session to match the language information for the first client;

detecting, by a second client-side synchronizer that executes on a second client, that the second client has established a second remote session on the server;

in response to detecting that the second client has established the second remote session on the server, accessing, by the second client-side synchronizer, client-side language settings on the second client to retrieve language information for the second client;

sending the language information for the second client to a second server-side synchronizer on the server; and generating, by the second server-side synchronizer, one or more requests to modify server-side language settings pertaining to the second remote session to match the language information for the second client;

wherein the modifications to the server-side languages settings pertaining to the first and second remote sessions cause the first and second remote sessions to be displayed in different languages.

12. The method of claim 11, wherein the language information for the first client comprises a locale of the first client and the language information for the second client comprises a locale of the second client.

13. The method of claim 12, wherein the language information for the first client further comprises one or more keyboard layouts that are set on the first client and the language information for the second client further comprises one or more keyboard layouts that are set on the second client.

14. The method of claim 11, further comprising:

prior to each of the first and second server-side synchronizers generating the one or more requests, accessing, by each of the first and second server-side synchronizers, server-side language settings pertaining to the first and second remote sessions respectively to determine whether the server-side language settings match the language information for the first and second clients respectively;

wherein each of the first and second server-side synchronizers generates the one or more requests only when the server-side language settings pertaining to the first and second remote sessions respectively do not match the language information for the first and second clients respectively.

15. One or more computer storage media storing computer executable instructions which when executed in a virtual desktop infrastructure (VDI) environment implement a method for synchronizing a language of a remote session with a client's language, the method comprising:

in response to a VDI client that executes on a client initiating a remote session on a server, accessing, by a client-side synchronizer, client-side language settings to retrieve language information, the language information defining a current locale of the client;

sending the language information to a server-side synchronizer that executes on the server;

in response to receiving the language information, accessing, by the server-side synchronizer, server-side language settings to determine a current locale of the remote session;

comparing the current locale of the remote session to the current locale of the client that is defined in the language information; and upon determining that the current locale of the remote session does not match the current locale of the client, modifying the server-side language settings to cause the current locale of the remote session to match the current locale of the client.

16. The computer storage media of claim 15, wherein the language information also defines a current keyboard layout of the client, the method further comprising:

accessing, by the server-side synchronizer, the server-side language settings to determine a current keyboard layout of the remote session;

comparing the current keyboard layout of the remote session to the current keyboard layout of the client that is defined in the language information; and upon determining that the current keyboard layout of the remote session does not match the current keyboard layout of the client, modifying the server-side language settings to cause the current keyboard layout of the remote session to match the current keyboard layout of the client.

17. The computer storage media of claim 16, wherein the remote session is a remote desktop session or a remote application session.

18. The computer storage media of claim 15, wherein the method further comprises:

prompting a user of the client to confirm whether the server-side language settings should be modified.

19. The computer storage media of claim 15, wherein the language information further defines one or more keyboard layouts that are set on the client, and wherein the server-side language settings are further modified to cause one or more keyboard layouts that are set in the remote session to match the one or more keyboard layouts that are set on the client.

20. The computer storage media of claim 15, wherein the remote session comprises a remote desktop or a remote application.

* * * * *